(12) United States Patent
Kim et al.

(10) Patent No.: US 10,063,390 B2
(45) Date of Patent: Aug. 28, 2018

(54) APPARATUS AND METHOD FOR DETECTING ETHERNET FRAME

(71) Applicant: LSIS CO., LTD., Gyeonggi-do (KR)

(72) Inventors: Woo-Hyun Kim, Gyeonggi-do (KR); Gyu-Sung Bae, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 133 days.

(21) Appl. No.: 15/224,360

(22) Filed: Jul. 29, 2016

(65) Prior Publication Data

US 2017/0033945 A1 Feb. 2, 2017

(30) Foreign Application Priority Data

Jul. 30, 2015 (KR) ........................ 10-2015-0108399

(51) Int. Cl.
*H04L 12/24* (2006.01)
*H04L 12/413* (2006.01)
*H04L 12/26* (2006.01)
*H04L 29/12* (2006.01)
*H04L 29/06* (2006.01)

(52) U.S. Cl.
CPC ............ *H04L 12/413* (2013.01); *H04L 43/10* (2013.01); *H04L 61/6022* (2013.01); *H04L 69/22* (2013.01)

(58) Field of Classification Search
CPC ......... H04L 12/26; H04L 29/06; H04L 43/00; H04L 7/042; H04L 12/12; H04L 12/407; H04L 12/413; H04L 12/24
See application file for complete search history.

(56) References Cited

U.S. PATENT DOCUMENTS 5,935,245 A * 8/1999 Sherer ................ H04L 63/1475
709/200
6,697,383 B1 * 2/2004 Li ............................ H04L 7/042
370/510

(Continued)

FOREIGN PATENT DOCUMENTS

JP  2001189752 A  7/2001
JP  2010161676 A  7/2010

(Continued)

OTHER PUBLICATIONS

Extended Search Report issued in corresponding European application No. 16176638.1-1853 dated Oct. 7, 2016.

(Continued)

*Primary Examiner* — Mohamed A Kamara
(74) *Attorney, Agent, or Firm* — K&L Gates LLP

(57) ABSTRACT

Disclosed embodiments relate to an apparatus and method for detecting Ethernet frames. In some embodiments, an Ethernet detecting circuit included in the apparatus for detecting Ethernet frames includes a received byte counter configured to calculate a byte count value of received data, a mask and pattern storage unit configured to calculate mask data and comparison data comprising a pattern of a frame, based on the calculated byte count value, a comparator configured to determine whether the received data corresponds to target data to be detected, based on the calculated mask data and comparison data, and a detection signal generator configured to output a detection signal corresponding to a result of the determination.

4 Claims, 5 Drawing Sheets

(56) References Cited

U.S. PATENT DOCUMENTS

| | | |
|---|---|---|
| 7,230,956 B1 | 6/2007 | Ambrose et al. |
| 7,373,454 B1 | 5/2008 | Noe |
| 7,921,263 B2 * | 4/2011 | Taunton .............. G06F 9/30036 |
| | | 711/154 |
| 8,997,231 B2 | 3/2015 | Karta et al. |
| 9,306,908 B2 | 4/2016 | Yoo |
| 2002/0077995 A1 | 6/2002 | Allison et al. |
| 2004/0190506 A1 | 9/2004 | Davis et al. |
| 2005/0013300 A1 * | 1/2005 | Akahane ................. H04L 43/00 |
| | | 370/395.3 |
| 2013/0227687 A1 | 8/2013 | Lee |
| 2014/0172123 A1 | 6/2014 | Lee et al. |

FOREIGN PATENT DOCUMENTS

| | | |
|---|---|---|
| KR | 20050019952 A | 3/2005 |
| KR | 20130031433 A | 3/2013 |
| KR | 20130101672 A | 9/2013 |
| KR | 20140064649 A | 5/2014 |
| KR | 20140077489 A | 6/2014 |

OTHER PUBLICATIONS

Japanese office action dated Jul. 11, 2017 corresponding to application No. 2016-148193.

* cited by examiner

APPARATUS AND METHOD FOR DETECTING ETHERNET FRAME

CROSS REFERENCE TO RELATED APPLICATIONS

This application claims the benefit of Korean Patent Application No. 10-2015-0108399, filed on Jul. 30, 2015 and entitled "APPARATUS AND METHOD FOR DETECTING ETHERNET FRAME", which is hereby incorporated by reference in its entirety.

BACKGROUND

Technical Field

The present disclosure relates to an apparatus and method for detecting Ethernet frames and, more particularly, to an apparatus for detecting Ethernet frames in the field of Ethernet network communication.

Description of the Related Art

Ethernet is the most typical short-range communication network of a bus structure. To transmit data over the Ethernet, a Carrier Sense Multiple Access with Collision Detection (CSMA/CD) scheme is used.

In transmitting data through an Ethernet frame, an Ethernet header and trailer are added to a data packet generated in the Internet layer, which is a higher layer, and then transmitted via a medium. When the data is received through the Ethernet frame, the header and the trailer are separated from each other, and the data packet is sent to the network layer.

The Ethernet frame includes a Preamble field for announcing, to a receiver, transmission of the Ethernet frame and providing a synchronization signal enabling distinction between 0 and 1 in the frame to receive, a Start Delimiter field indicating the start position of the frame, a Destination MAC Address field, a Source MAC Address, a Length field indicating the size of transmitted data with a variable length contained in a data field, a data field, and a Checksum field enabling a receiver host to recognize occurrence of an error of data variation in the process of data transmission.

To process Ethernet data, the received Ethernet frame needs to be detected and transferred through a path where the received Ethernet frame can be appropriately processed according to the result of the detection.

Accordingly, there is a need for an Ethernet frame detecting apparatus capable of efficiently detecting Ethernet frames.

SUMMARY

It is an aspect of some embodiments of the present disclosure to efficiently detect Ethernet frames in various ways.

It is another aspect of some embodiments of the present disclosure to reduce production costs of Ethernet frame detecting circuits and simplify configuration thereof.

In accordance with one aspect of some embodiments of the present disclosure, an Ethernet frame detecting circuit for detecting Ethernet frames includes a received byte counter configured to calculate a byte count value of received data; a mask and pattern storage unit configured to calculate mask data and comparison data comprising a pattern of a frame, based on the calculated byte count value; a comparator configured to determine whether the received data corresponds to target data to be detected, based on the calculated mask data and comparison data; and a detection signal generator configured to output a detection signal corresponding to a result of the determination.

The mask and pattern storage unit may include a mask and pattern storage memory configured to store a mask register for ignoring bits which need not be detected and a pattern register indicating a frame to be detected and to calculate the mask data and comparison data corresponding to the calculated byte count value, based on the stored mask register and pattern register.

The mask and pattern storage memory may include at least one of a random access memory (RAM), a read only memory (ROM) and a flash memory.

The mask and pattern storage unit may include a mask register column configured to store a mask register for ignoring bits which need not be detected; a first multiplexer (mux) configured to calculate the mask data based on the mask register and the calculated byte count value; a pattern register column configured to store a pattern register indicating a frame to be detected; and a second mux configured to calculate the comparison data based on the pattern register and the calculated byte count value.

The comparator may include a first comparator configured to ignore bits which need not be detected in the received data, based on the calculated mask data; and a second comparator configured to compare the received data with the target data to be detected, based on the calculated comparison data.

With an apparatus and method for detecting Ethernet frames according to some embodiments of the present disclosure, Ethernet frames may be detected through various configurations and property requirements for the Ethernet frame detecting apparatus may be satisfied.

In addition, production costs of the Ethernet frame detecting circuits may be reduced, and configuration may be simplified.

DETAILED DESCRIPTION

Figure 1:
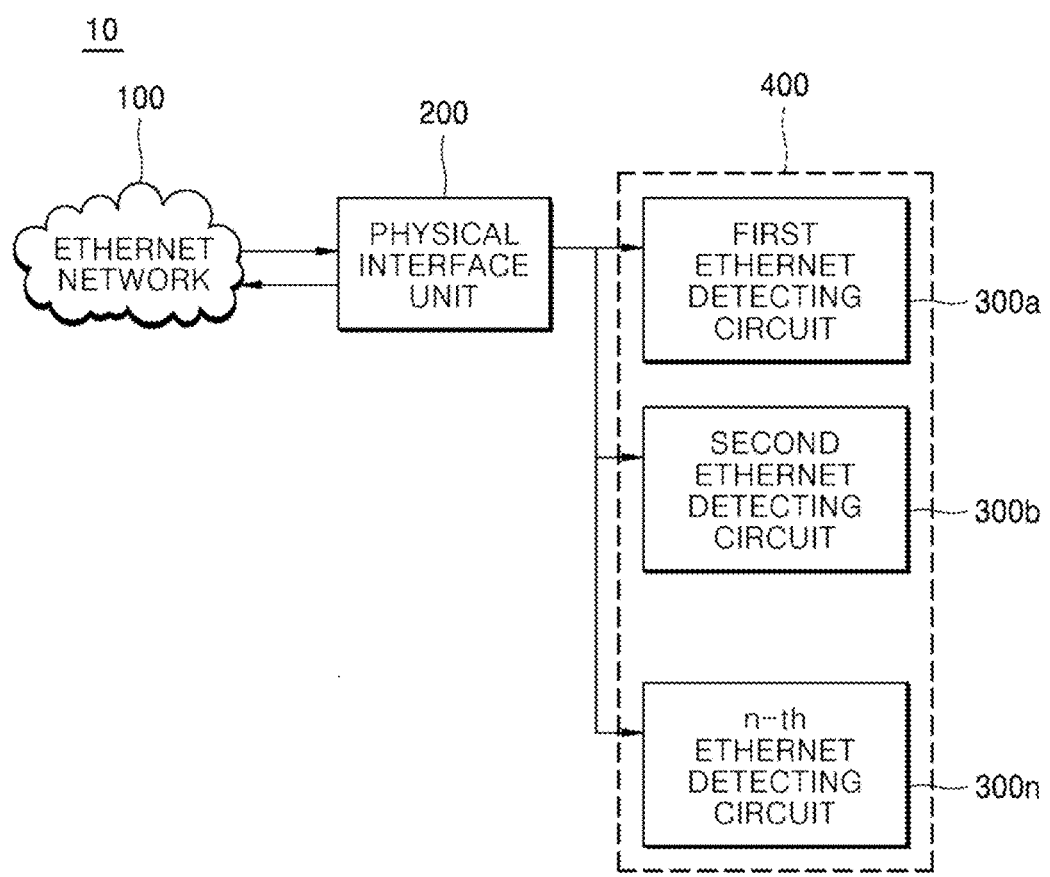
FIG. 1 is a block diagram illustrating configuration of an Ethernet system according to some embodiments of the present disclosure.

Hereinafter, embodiments of the present disclosure will be described in detail with reference to the accompanying drawings. As used herein, the suffixes "module" and "unit" are added or used interchangeably to facilitate preparation of this specification and are not intended to suggest meanings or functions distinguished therebetween.

Advantages and features of the present disclosure and methods to achieve them will become apparent from the descriptions of embodiments herein below with reference to the accompanying drawings. However, the present disclosure is not limited to embodiments disclosed herein but may be implemented in various different forms. The embodiments are provided for making the disclosure of the present disclosure thorough and for fully conveying the scope of the present disclosure to those skilled in the art. It is to be noted that the scope of the present disclosure is defined only by the claims. Like reference numerals denote like elements throughout the descriptions.

In describing embodiments of the present disclosure disclosed in this specification, relevant well-known functions and constituents may not be described in detail if it is determined that such description can unnecessarily obscure the subject matter of the present disclosure. Terms which will be used below are defined in consideration of the functions of the corresponding elements in some embodiments of the present disclosure.

It should be understood that the present disclosure is not limited to the following embodiments, and that some embodiments are provided for illustrative purposes only. The scope of the disclosure should be defined only by the accompanying claims and equivalents thereof. The definitions of the terms may vary depending on intention of a user or operator, a precedent case, or the like. Therefore, the terms should be defined based on the entire specification.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks. These computer program instructions may also be stored in a computer-useable or computer-readable memory that can direct a computer or other programmable data processing apparatuses to function in a particular manner, such that the instructions stored in the computer-useable or computer-readable memory produce an article of manufacture including instructions which implement the function specified in the flowchart and/or block diagram block or blocks. The computer program instructions may also be loaded onto a computer or other programmable data processing apparatuses to cause a series of operational steps to be performed on the computer, other programmable apparatuses to produce a computer implemented process such that the instructions which execute on the computer or other programmable apparatuses provide processes for implementing the functions specified in the flowchart and/or block diagram block or blocks.

In addition, each block or step in the flowchart or block diagrams may represent a module, segment, or portion of code, which comprises one or more executable instructions for implementing the specified logical function(s). It should also be noted that, in some alternative implementations, the functions noted in the blocks or steps may occur out of the order noted in the figures. For example, two blocks or steps shown in succession may, in fact, be executed substantially concurrently, or the blocks or steps may sometimes be executed in the reverse order, depending upon the functionality involved.

Hereinafter, an Ethernet system 10 according to some embodiments of the present disclosure will be described with reference to FIG. 1.

FIG. 1 is a block diagram illustrating configuration of an Ethernet system according to some embodiments of the present disclosure.

Referring to FIG. 1, an Ethernet system 10 includes an Ethernet network 100, a physical interface unit 200, and an Ethernet detecting apparatus 400.

The Ethernet network 100 may represent a physical communication network. For example, the Ethernet network 100 may represent a local area network (LAN) of a bus structure.

The physical interface unit 200 may be an interface connected to the Ethernet network 100 to receive data. The Ethernet detecting apparatus 400 may detect an Ethernet frame of received data.

The Ethernet detecting apparatus 400 may include a plurality of Ethernet detecting circuits 300a, 300b, ... 300n.

Herein, each Ethernet detecting circuit may detect one frame including the maximum length of L bytes. Thereby, the Ethernet detecting apparatus 400 may detect n frames through a plurality of Ethernet detecting circuits 300a, 300b, ... 300n including n Ethernet detecting circuits.

For ease of description, a reference numeral '300' will be assigned to the Ethernet detecting circuits.

Hereinafter, an Ethernet detecting circuit 300 will be described in detail with reference to FIG. 2.

Figure 2:
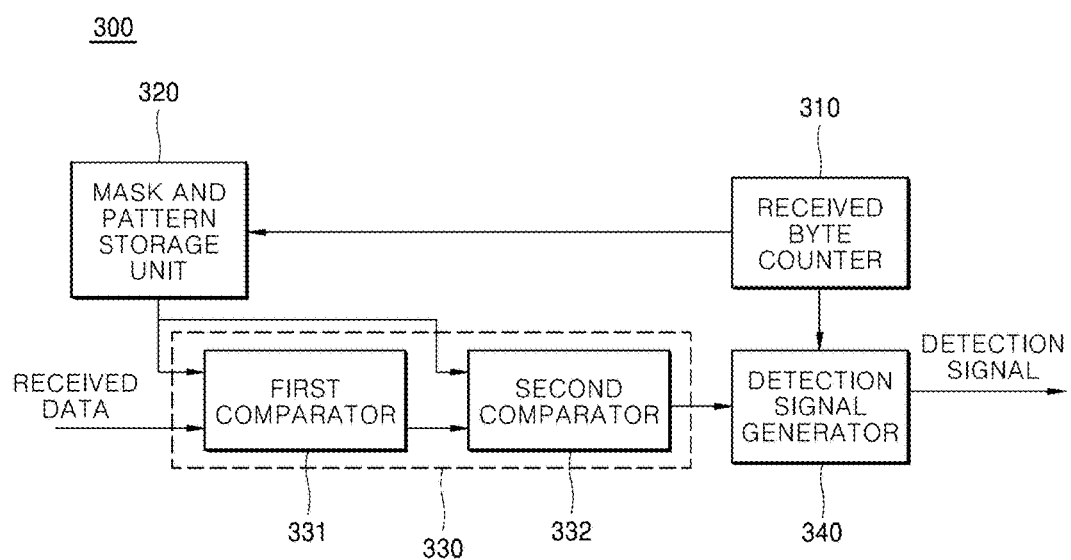
FIG. 2 is a block diagram illustrating configuration of an Ethernet detecting circuit according to some embodiments of the present disclosure.

FIG. 2 is a block diagram illustrating configuration of an Ethernet detecting circuit according to some embodiments of the present disclosure.

Referring to FIG. 2, the Ethernet detecting circuit 300 includes a received byte counter 310, a mask and pattern storage unit 320, a comparator 330, and a detection signal generator 340.

The received byte counter 310 may count the byte of the Ethernet frame of received data. Thereby, the received byte counter 310 may calculate the byte count value of data which is being received. The received byte counter 310 may also transmit the calculated count value to the mask and pattern storage unit 320 and the detection signal generator 340.

The mask and pattern storage unit 320 may calculate mask data and comparison data corresponding to the calculated count value based on the stored mask register and pattern register.

Herein, the mask register may be a register including a length of L bytes and indicating a bit mask. Accordingly, the mask register may represent a register which is used to ignore bits which need not be detected. The mask data may represent a mask register corresponding to the calculated count value.

The pattern register may be a register including a length of L bytes and indicating a bit comparison pattern. Accordingly, the pattern register may represent a register for indicating a pattern of frames to be detected. The comparison data may represent a pattern register corresponding to the calculated count value.

The comparator 330 may compare the calculated mask data and comparison data with received data. For example, the comparator 330 may ignore bits which need not be detected in the received data, based on the calculated mask data. The comparator 330 may also detect a pattern of frames to be detected in the received data, based on the calculated comparison data. Herein, the data comprising the pattern of frames to be detected may be referred to as target data. The comparator 330 transmits the result of comparison to the detection signal generator 340.

Meanwhile, the comparator 330 may include a plurality of comparators. For example, the comparator 330 may include a first comparator 331 and a second comparator 332.

The first comparator 331 may ignore bits which need not be detected in the received data, based on the calculated mask data.

The second comparator 332 may compare the received data with the target data to be detected, based on the calculated comparison data.

The received data may be sequentially transferred to the first comparator 331 and the second comparator 332.

The detection signal generator 340 outputs a detection signal based on the result of comparison.

The detection signal generator 340 may output a detection signal which indicates whether or not a frame including the maximum length of L bytes has been detected as a frame to be detected.

For example, when a frame to be detected is detected, the detection signal generator 340 may output 1. When the detected frame is not a frame to be detected, the detection signal generator 340 may output 0.

Hereinafter, operation of the Ethernet detecting circuit 300 will be described based on the above description.

Figure 3:
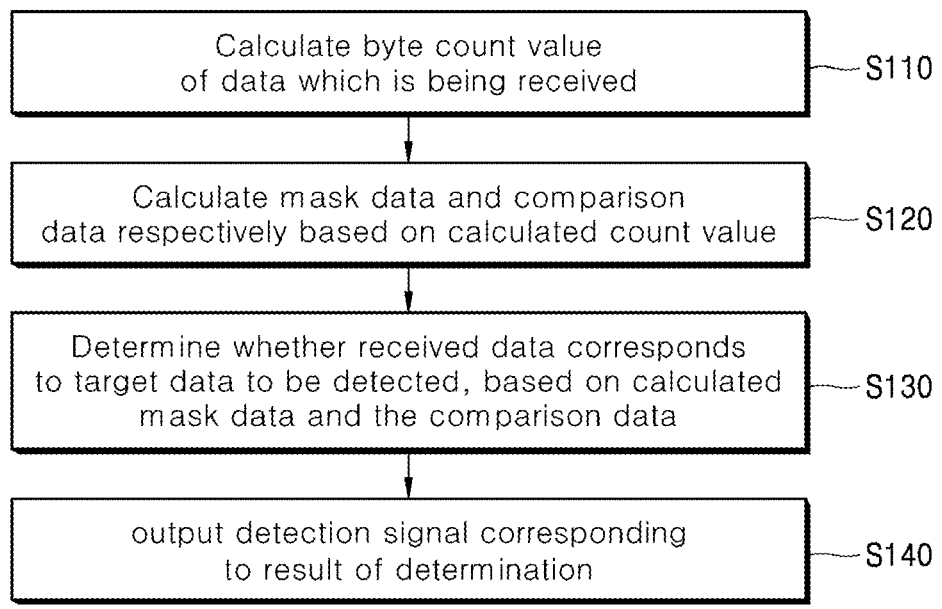
FIG. 3 is a flowchart illustrating operation of an Ethernet detecting circuit according to some embodiments of the present disclosure.

FIG. 3 is a flowchart illustrating operation of an Ethernet detecting circuit according to some embodiments of the present disclosure.

Referring to FIG. 3, the received byte counter 310 of the Ethernet detecting circuit 300 calculates the byte count value of the data which is being received (S110).

The received byte counter 310 may count the byte of data which is being received or has been received in the Ethernet frame. Thereby, the received byte counter 310 may calculate the byte count value of the data which is being received. The received byte counter 310 may transmit the calculated count value to the mask and pattern storage unit 320 and the detection signal generator 340.

The mask and pattern storage unit 320 of the Ethernet detecting circuit 300 calculates the mask data and comparison data respectively based on the calculated count value (S120).

The mask and pattern storage unit 320 may calculate mask data and comparison data corresponding to the calculated count value based on the stored mask register and pattern register.

An example will be described with reference to FIG. 4.

Figure 4:
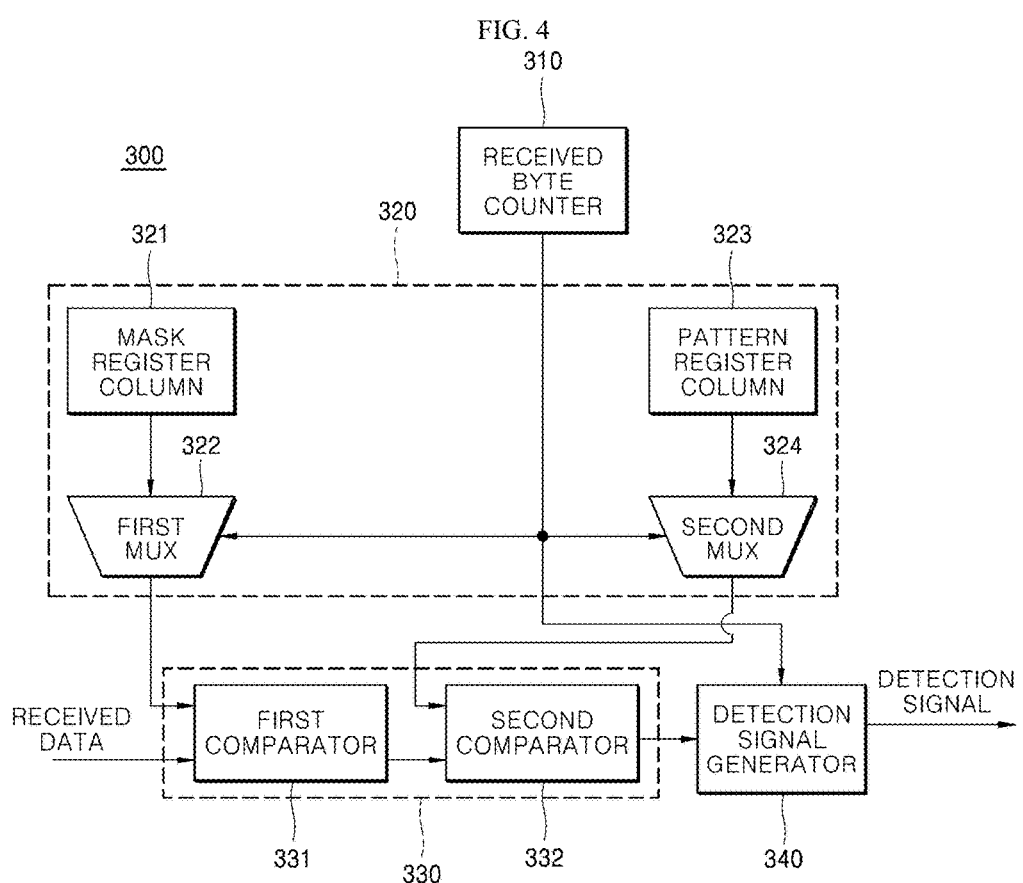
FIG. 4 is a block diagram of an Ethernet detecting circuit illustrating configuration of a mask and pattern storage unit according to some embodiments of the present disclosure.

FIG. 4 is a block diagram of an Ethernet detecting circuit illustrating configuration of a mask and pattern storage unit according to some embodiments of the present disclosure.

Referring to FIG. 4, the mask and pattern storage unit 320 of the Ethernet detecting circuit 300 may include a mask register column 321, a first multiplexer (mux) 322, a pattern register column 323, and a second mux 324.

The mask register column 321 may store a mask register.

The first mux 322 may calculate mask data based on the mask register stored in the mask register column 321 and the calculated count value.

For example, the first mux 322 may select mask data from the mask register stored in the mask register column 321, taking the calculated count value as a selection signal.

The first mux 322 may transmit the at calculated comparison mask data to the comparator 330. For example, the first mux 322 may transmit the calculated mask data to the first comparator 331.

The pattern register column 323 may store a pattern register.

The second mux 324 may calculate comparison data based on the pattern register stored in the pattern register column 323 and the calculated count value.

For example, the second mux 324 may select comparison data from the pattern register stored in the pattern register column 323, taking the calculated count value as a selection signal.

The second mux 324 may transmit the calculated comparison data to the comparator 330. For example, the second mux 324 may transmit the calculated comparison data to the second comparator 332.

Hereinafter, some embodiments will be described with reference to FIG. 5.

Figure 5:
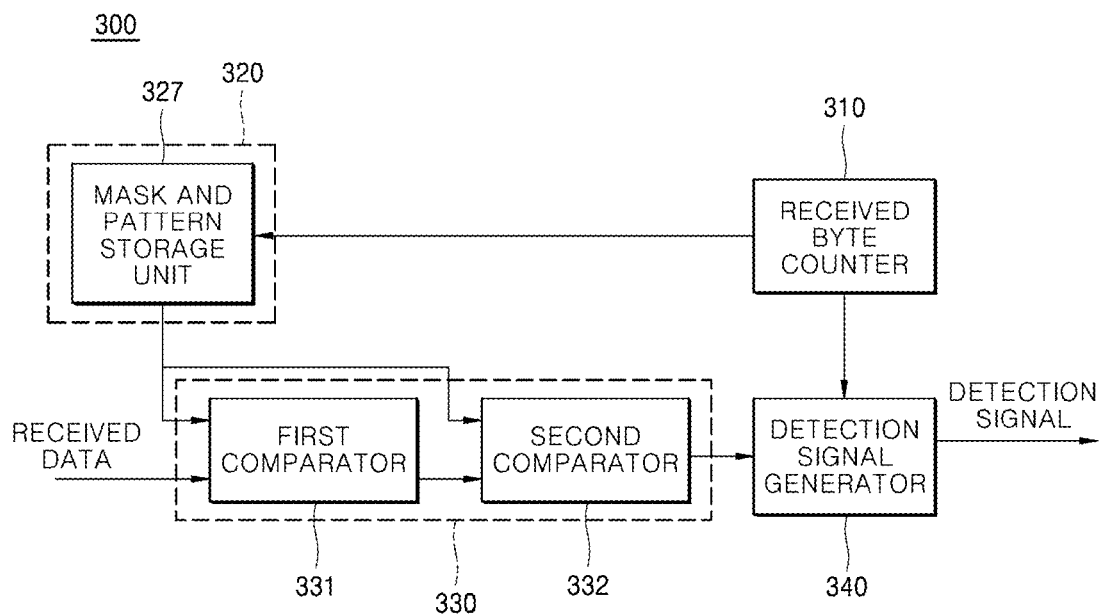
FIG. 5 is a block diagram of an Ethernet detecting circuit illustrating configuration of a mask and pattern storage unit according to some embodiments of the present disclosure.

FIG. 5 is a block diagram of an Ethernet detecting circuit illustrating configuration of a mask and pattern storage unit according to some embodiments of the present disclosure.

Referring to FIG. 5, the mask and pattern storage unit 320 of the Ethernet detecting circuit 300 include a mask and pattern storage memory 327.

The mask and pattern storage memory 327 may store a mask register and pattern register. The mask and pattern storage memory 327 may calculate mask data and comparison data corresponding to the calculated count value, based on the stored mask register and pattern register. The mask and pattern storage memory 327 may transmit the calculated mask data and comparison data to the comparator 330. For example, the mask and pattern storage memory 327 may transmit the calculated mask data to the first comparator 331, and transmit the calculate comparison data to the second comparator 332.

The mask and pattern storage memory 327 may include various types of memories. For example, the mask and pattern storage memory 327 may include at least one of a random access memory (RAM), a read-only memory (ROM) and a flash memory.

The Ethernet detecting circuit 300 including the mask and pattern storage memory 327 can reduce the use of a device such as D-flip-flop. Accordingly, production costs of Ethernet detecting circuits may be reduced, and semiconductor chips constituting the Ethernet detecting circuit may be downsized.

Description will be given with reference back to FIG. 3.

The comparator 330 of the Ethernet detecting circuit 300 determines whether the received data corresponds to data to be detected, based on the calculated mask data and comparison data (S130).

The comparator 330 may compare the calculated comparison data with the received data.

For example, the comparator 330 may ignore bits which need not be detected in the received data, based on the calculated mask data. The comparator 330 may also detect a pattern of a frame to be detected in the received data, based on the calculated comparison data. Herein, data comprising the pattern of frames to be detected may be referred to as target data. Thus, the comparator 330 may determine whether the received data corresponds to target data to be detected. The comparator 330 may transmit, to the detection signal generator 340, the result of determination according to comparison between the mask data and comparison data with the received data.

As described above, the comparator 330 may include a plurality of the comparators.

For example, the comparator 330 may include a first comparator 331 and a second comparator 332.

The first comparator 331 may ignore bits which need not be detected in the received data, based on the calculated mask data, and the second comparator 332 may compare the received data with the target data to be detected, based on the calculated comparison data. The first comparator 331 and the second comparator 332 may transmit the result of comparison to the detection signal generator 340.

The detection signal generator 340 of the Ethernet detecting circuit 300 outputs a detection signal corresponding to the determination result (S140).

The detection signal generator 340 outputs a detection signal based on the delivered determination result.

The detection signal generator 340 may output a detection signal which indicates whether or not a frame including the maximum length of L bytes has been detected as a frame to be detected.

For example, when a frame to be detected is detected, the detection signal generator 340 may output 1. When the detected frame is not a frame to be detected, the detection signal generator 340 may output 0.

As described above, the Ethernet detecting circuit 300 may output a detection signal indicating whether or not a frame including the maximum length of L bytes has been detected as a frame to be detected in the received data.

The Ethernet detecting apparatus 400 may detect a plurality of frames simultaneously through a plurality of Ethernet detecting circuits 300.

Thereby, when the Ethernet detecting apparatus 400 includes n Ethernet detecting circuit 300, the Ethernet detecting apparatus 400 may detect Ethernet frames that includes the size of N*L bytes simultaneously.

According to some embodiments of the present disclosure, the method described above can be implemented with processor-readable codes in a process-readable medium including a recorded program. Examples of the processor-readable medium may include one of ROM, RAM, CD-ROM, magnetic tapes, floppy discs, and optical data storage devices, and also include a carrier-wave type implementation (e.g., transmission via the Internet).

With an apparatus and method for detecting Ethernet frames according to embodiments of the present disclosure, Ethernet frames can be detected through various configurations, and thus property requirements for the Ethernet frame detecting apparatus may be satisfied.

According embodiments of the present disclosure, production costs of Ethernet frame detecting circuits may be reduced and configuration thereof may be simplified.

The configuration and method described above are not limited to some embodiments disclosed in the foregoing description. A part or entirety of some embodiments may be selectively combined to enable various modifications.

While embodiments of the present disclosure have been described above, it should be understood that they have been presented by way of example only, and not limitation. It will be apparent to persons skilled in the art that various modifications and variations can be made to the present disclosure without departing from the spirit and scope of the disclosure as disclosed in the accompanying claims. Thus, it is intended that the present disclosure include modifications and variations that are within the scope of the appended claims and their equivalents. The accompanying claims and their equivalents are intended to cover such forms or modifications as would fall within the scope and spirit of the protection. Various components illustrated in the figures may be implemented as hardware and/or software and/or firmware on a processor, ASIC/FPGA, dedicated hardware, and/or logic circuitry. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. An Ethernet frame detecting circuit for detecting Ethernet frames comprising:
    a received byte counter configured to calculate a byte count value of received data;
    a mask and pattern storage unit configured to calculate mask data and comparison data associated with a pattern of a frame based at least on the calculated byte count value;
    a comparator configured to determine whether the received data corresponds to target data to be detected based at least on the calculated mask data and the comparison data; and
    a detection signal generator configured to output a detection signal based at least on the determination,
    wherein the mask and pattern storage unit comprises:
        a mask and pattern storage memory configured to store a mask register for ignoring bits which need not be detected and a pattern register indicating a frame to be detected, and to calculate the mask data and the comparison data corresponding to the calculated byte count value based at least on the stored mask register and the pattern register.

2. The Ethernet frame detecting circuit according to claim 1, wherein the mask and pattern storage memory further comprises at least one of: a random access memory (RAM), a read only memory (ROM), or a flash memory.

3. The Ethernet frame detecting circuit according to claim 1, wherein the mask and pattern storage unit comprises:
    a mask register column configured to store the mask register;
    a first multiplexer configured to calculate the mask data based at least on the mask register and the calculated byte count value;
    a pattern register column configured to store the pattern register; and
    a second multiplexer configured to calculate the comparison data based at least on the pattern register and the calculated byte count value.

4. The Ethernet frame detecting circuit according to claim 1, wherein the comparator comprises:
    a first comparator configured to ignore bits which need not be detected in the received data based at least on the calculated mask data; and
    a second comparator configured to compare the received data with the target data to be detected based at least on the calculated comparison data.

* * * * *